April 2, 1940. T. B. FUNK 2,196,149
ANTIWIND CONSTRUCTION FOR LAWN MOWER REELS
Filed Dec. 7, 1938
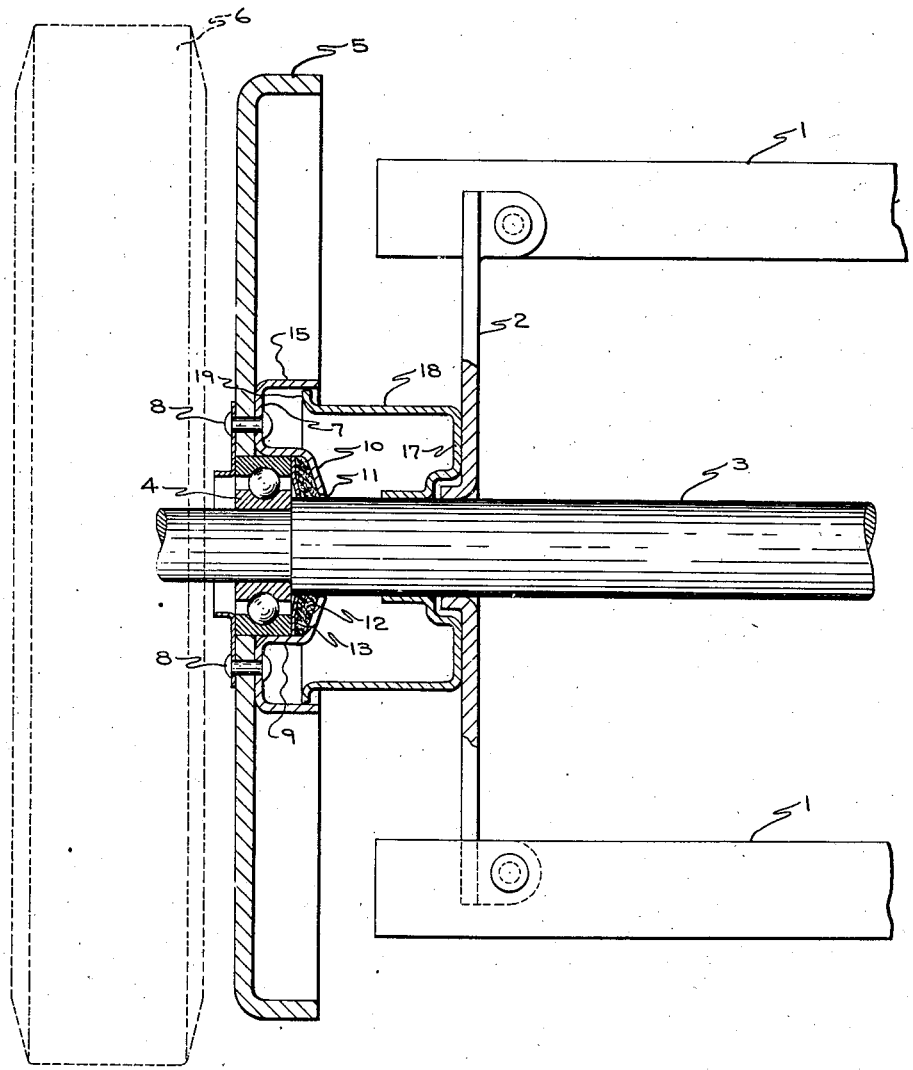
Inventor
TRUMAN B. FUNK
By Beaman & Langford
Attorney Patented Apr. 2, 1940

2,196,149

UNITED STATES PATENT OFFICE 2,196,149

ANTIWIND CONSTRUCTION FOR LAWN MOWER REELS

Truman B. Funk, Jackson, Mich., assignor to "Yard-Man," Inc., Jackson, Mich., a corporation of Michigan Application December 7, 1938, Serial No. 244,313

5 Claims. (Cl. 56—294)

This invention to lawn mowers and particularly to a lawn mower designed to prevent long grass from winding about the shaft of the cutting reel adjacent the ends thereof.

In lawn mowers as generally constructed there is a short section of the cutting reel shaft extending between the end, blade supporting spiders of the cutting reel and the lawn mower frame, on which long grass frequently winds and builds up until such a size that it rubs against the frame and associated parts of the lawn mower, exerting a drag which hinders free operation.

The present invention is an improvement over Patent No. 1,834,964 to Nichols, which discloses one form of construction for preventing the winding of the grass about the cutting reel shaft.

An object of the invention is provide concentric housings for the outer ends of the cutting reel shafts of lawn mowers, having a diameter substantially greater than the cutting reel shaft.

Another object of the invention is to provide an antiwind construction of the character described, of sheet metal.

A further object of the invention is to provide interlocking cup-shaped members secured to the lawn mower frame and the cutting reel shaft, respectively, for housing the portion of the cutting reel shaft between the end spider for supporting the cutting blades and the frame.

These and other objects will be apparent from the following specification when taken with the accompanying drawing, in which the figure represents a vertical section of a portion of a lawn mower, illustrating the invention.

Referring particularly to the drawing, the reference character 1 indicates blades of a cutting reel supported by a spider 2, which is in turn mounted on a cutting reel shaft 3. The cutting reel shaft 3 is supported in a bearing 4 partially supported in a sheet metal frame member 5. It will be understood that the lawn mower illustrated will have at the opposite end thereof another bearing member 4 and frame member 5 for supporting the opposite end of the cutting reel shaft 3. The cutting reel shaft 3 has an extension 5 beyond the bearing 4, to which may be connected suitable mechanism for rotating the same from the ground wheels 6 shown in dotted outline.

The frame 5 is of sheet metal construction and has secured thereto a member 7 in any suitable manner, as by rivets 8. The member 7 is in the form of a ring-shaped cup having the bottom thereof bearing against the frame member 5 and secured thereto by the rivets 8. The inner side of the member 7 comprises a portion 9 concentric with the shaft 3 and forming a support for the portion of the bearing 4 overhanging from the frame member 5. Extending generally inwardly from the free end of the portion 9 is a web portion 10, which has a central opening 11 therethrough for receiving the shaft 3. Inside of the portion 10 is a suitable packing material 12 held away from the bearing 4 by a washer 13. It will be clear that the packing 12 bears against the shaft 3 and serves to keep dirt and dust away from the bearing 4. The outer side 15 of the member 7 is concentric to the shaft 3 and extends axially toward the spider 2.

A second member 17 taking the form of a ring-shaped cup is connected to the cutting reel, as by welding to the spider 2, the shaft 3, or both. As will be clear from the drawing, the bottom of the member 17 bears against the spider 2. The inner side of the member 17 is of substantially the same internal diameter as the shaft 3 and is telescopically disposed thereover. The outer side 18 of the member 17 is concentric with the shaft 3 and projects axially toward the frame member 5 into overlapping relation with the portion 15 of the member 7. At the free end of the side 18 is a web 19 projecting radially outwardly in overlapping and substantial contacting relation with the side 15 of the member 7.

The sides 15 and 18 of the members 7 and 17, respectively, together with the web 19, form a housing about that portion of the shaft 3 between the spider 2 and the frame member 5. This housing, as will be clear from the drawing, is of substantially larger diameter than the shaft 3. The large diameter of the housing results in making it impossible for long grass and the like to wind about it. It will be seen that the structure of the present invention provides not only an antiwind device for preventing the winding of grass and the like about the cutting reel shaft and thereby exerting a drag on the lawn mower, but it also provides an effective dirt and dust shield for the reel shaft supporting bearing. The construction is exceedingly simple, and, as will be observed, contains no part that might get out of order.

It will be apparent from the foregoing description that while the invention has been explained as applied to only one end of a lawn mower, it is to be applied at both ends of the lawn mower. It is to be understood that a particular feature of the invention is the provision of the upturned web on the cylindrical member 18. It has been found that with this construction the tendency of grass and dirt to get into the space within the cup-shaped members 7 and 17 is substantially entirely eliminated. While the exact theory of the action is not fully understood, it is believed that it is because the peripheral speed of the member 18 is less than the peripheral speed of the periphery of the web 19. While the member 18 may be of larger diameter than the cylindrical member 15 and the web 19 may extend radially inwardly into near engagement with the member 15, it has been found that the structure as disclosed is more satisfactory.

What I desire to secure and claim by Letters Patent is:

1. In a lawn mower, the combination with a sheet metal frame, a cutting reel having a shaft and a blade supporting spider, and a bearing mounting said shaft, said bearing being mounted in said frame, of a sheet metal member connected to said frame having a web portion surrounding said shaft and projecting outwardly therefrom to one side of said bearing to shield the same, said member also having a portion concentric with said shaft extending axially of said shaft from said frame toward said spider, a second sheet metal member connected to said spider, said last named member having a portion concentric with said shaft extending axially of said shaft from said spider toward said frame, and an annular outwardly projecting flange on the concentric portion of said second member underlapping said first named concentric portion and providing with said two concentric portions a housing about said shaft, said housing having a diameter substantially greater than that of said shaft.

2. In a lawn mower, the combination with a sheet metal frame, a cutting reel having a shaft and a blade supporting spider, and a bearing mounting said shaft, said bearing being partially supported by said frame, of a sheet metal member connected to said frame having a web portion surrounding said shaft and projecting outwardly therefrom to one side of said bearing to shield the same, said member having a portion concentric with said shaft extending axially thereof in telescopic relation with a portion of said bearing to support the same, said member also having a portion concentric with said shaft extending axially of said shaft from said frame, a second sheet metal member connected to said spider, said last named member having a portion concentric with said shaft extending axially of said shaft from said spider toward said first named concentric portion, and an annular flange on the concentric portion of said second member underlapping said first named concentric portion and providing with said two concentric portions a housing about said shaft, said housing having a diameter substantially greater than that of the shaft.

3. In a lawn mower, the combination with a sheet metal frame, a cutting reel having a shaft and a blade supporting spider, and a bearing mounting said shaft, said bearing being partially supported by said frame, of a sheet metal member in the form of a ring-shaped cup connected to said frame and arranged concentrically with said shaft, the inner side of said cup being in overlapping and supporting relation to a portion of said bearing and having an annular web portion projecting toward said shaft to provide a shield for said bearing, the outer side of said member being concentric with said shaft and projecting toward said spider, a second sheet metal member in the form of a cup connected to said spider, the outer side of said member being concentric with said shaft and projecting toward said frame, the outer sides of said two members being in overlapping relation, providing a housing for the portion of said shaft between said spider and said frame, said housing having a diameter substantially greater than that of said shaft.

4. In a lawn mower having a frame and a cutting reel supported therein having a shaft and a blade supporting spider adjacent one end thereof, a member in the form of a cup having cylindrical sides and a bottom substantially normal to the sides, said bottom being connected to said frame and said sides being arranged concentrically with said shaft, having the open side thereof facing toward said spider, a second member in the form of a cup having cylindrical sides and a bottom substantially normal to said sides, the bottom being connected to said spider and the sides thereof being arranged concentrically with said shaft and having the open side thereof facing toward said frame, the outer edges of the sides of said members being in overlapping relation to provide a housing about said shaft between said spider and said frame, the outer wall of said housing having substantially its entire surface comprised of the sides of said second member, whereby a minimum non-rotatable surface is provided on which dirt may build up in a position to enter the housing.

5. In a lawn mower having a frame and a cutting reel supported therein having a shaft and a blade supporting spider adjacent one end thereof, a member in the form of a cup having cylindrical sides and a bottom substantially normal to the sides, said bottom being connected to said frame and said sides being arranged concentrically with said shaft, having the open side thereof facing toward said spider, a second member in the form of a cup having cylindrical sides and a bottom substantially normal to said sides, the bottom being connected to said spider and the sides thereof being arranged concentrically with said shaft and having the open side thereof facing toward said frame, the outer edges of the sides of said members being in overlapping relation to provide a housing about said shaft between said spider and said frame, the outer wall of said housing having substantially its entire surface comprised of the sides of said second member, whereby a minimum non-rotatable surface is provided on which dirt may build up in a position to enter the housing, and a radial flange connected to one of said members and disposed between said overlapping portions.

TRUMAN B. FUNK.